United States Patent [19]

Hveding

[11] 4,160,611

[45] Jul. 10, 1979

[54] SYSTEMS FOR LAUNCHING OR HAULING UP SMALL BOATS

[75] Inventor: Arne Hveding, Borsa, Norway

[73] Assignee: Lade Metall A/S, Trondheim, Norway

[21] Appl. No.: 870,334

[22] Filed: Jan. 18, 1978

[30] Foreign Application Priority Data

Jan. 17, 1977 [NO] Norway .............................. 770127

[51] Int. Cl.² .............................................. B63C 3/12
[52] U.S. Cl. .......................................... 405/2; 405/7; 104/244
[58] Field of Search ............... 61/67, 65, 66; 104/244, 104/243; 405/2, 3, 7

[56] References Cited

U.S. PATENT DOCUMENTS

| 334,094 | 1/1886 | Staples | 61/67 |
| 3,690,267 | 9/1972 | Sutton | 104/244 |

Primary Examiner—Jacob Shapiro

[57] ABSTRACT

Systems for launching or hauling up small boats, especially pleasure boats and the like, include a pair of rails joined together by sleepers and a carriage having two or more pairs of wheels which run along the rails. The rails are designed so that each of them forms a first track which is obliquely disposed in a lateral direction relative to a horizontal plane. A second track adjacent the first track forms an angle of about 90° in a lateral direction relative to the first track.

10 Claims, 5 Drawing Figures

SYSTEMS FOR LAUNCHING OR HAULING UP SMALL BOATS

BACKGROUND OF THE INVENTION

1. Field of the Invention

This invention relates to systems for launching or hauling up small boats, especially pleasure boats and the like.

2. Description of Prior Art

In the case of conventional systems which involve the use of a pair of rails joined together with sleepers, upon which runs a carriage having two pairs of wheels, it is desirable that the carriage which is to support the boat shall be relatively light. Even if the boat does not have a lower specific gravity than water, it can happen on handling below water that the boat receives a positive lift on one or both sides by virtue of its own buoyancy, the force of the waves and possibly due to the heeling or listing of the vessel. This lift can be sufficient to carry the boat from the rails or it is raised so that it passes from rolling abutment to a sliding friction between the rail and one or another form of stops, both of which possibilities are undesirable.

SUMMARY OF INVENTION

It is a main object of the invention, therefore, to devise a rail/carriage system in which the carriage can also roll easily in at least a partially weightless condition, that is to say in which the wheels on one or both sides are raised from normal abutment against the rails. In addition, the system must be so simple and reasonable that it can be made available to as many small boat owners as possible.

It is another object of the invention to create wheel a suspension which makes it possible to alter the ability of the carriage to support in such a system in a simple manner.

According to the present invention a system for launching or hauling up pleasure and like small boats comprises a pair of rails joined together by sleepers and a carriage having at least two pairs of wheels which run along the rails, the rails being designed so that each of them forms a first track which is obliquely disposed in a lateral direction relative to a horizontal plane and a second track adjacent said first track and forming an angle in a lateral direction relative to the first track, said first track forming an abutment for the supporting surface of the wheels and the latter having axes obliquely disposed relative to a horizontal plane.

BRIEF DESCRIPTION OF THE DRAWINGS

In order that the invention can be more clearly understood, convenient embodiments thereof will now be described, by way of example, with reference to the accompanying drawings in which.

DESCRIPTION OF CONVENIENT EMBODIMENTS

Figure 1:
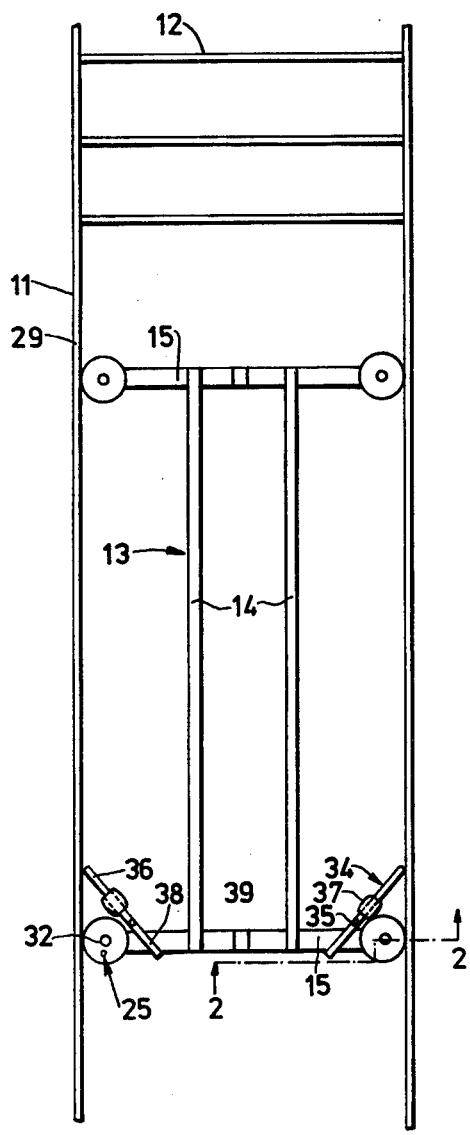
FIG. 1 is a schematic top view of a system for launching or hauling up small boats.

Referring to FIG. 1, a pair of rails 11 are held together by sleepers 12 arranged along the rails at a suitable mutual distance apart. On the rails 11 runs a carriage 13 which is constructed with two longitudinal support beams 14 which are fastened at their opposite ends and in spaced apart relationship to two cross beams 15. The beams 14 and 15 are of U-shaped profile with the opening turned down and are held together by screw nut connections.

Figure 2:
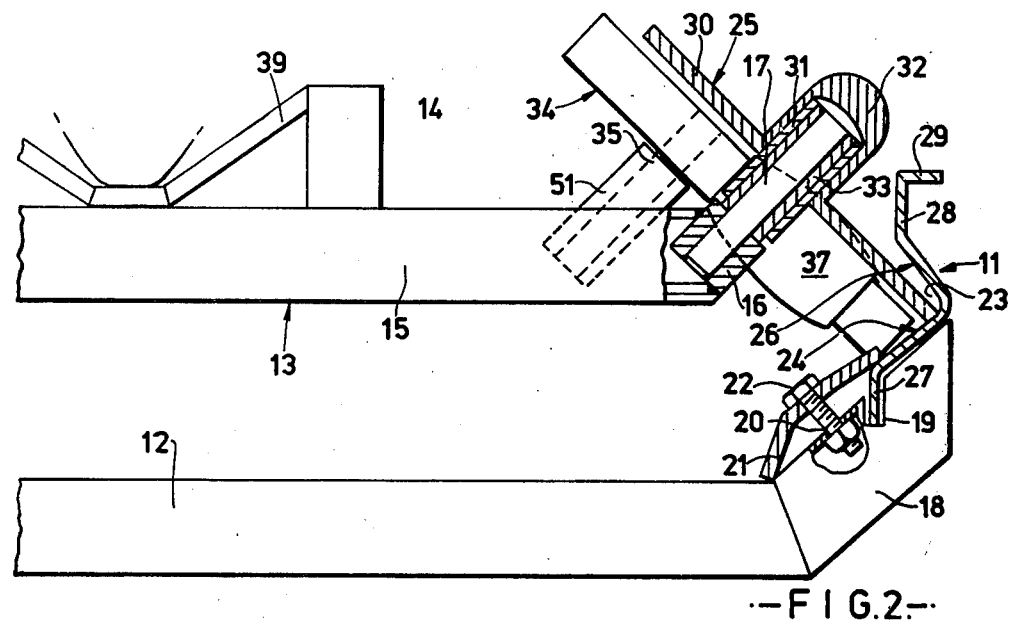
FIG. 2 is a section on the line 2—2 of FIG. 1.

At the end of each cross beam 15 there is fastened, for example, by welding, a bushing 16 which supports a readily detachable shaft pin 17 which is directed upwardly and outwardly at an angle of about 45° to the axial direction of the cross beam (see FIG. 2).

In FIG. 2, there is illustrated a sleeper 12, for example, made of pipe of rectangular profile having short end portions 18 which form an angle of about 45° obliquely upwards relative to the main direction of the sleeper. Each of these end portions 18 is provided with an upwardly directed cavity or notch 19 for the under edge of the rail 11 and a hole 20 for securely clamping the rail 11 against the cavity 19 by way of a clamp plate 21 and a screw-nut connection 22. The clamp plate 21 serves, in addition, as an abutment for a reverse run lock which will be described further below.

The rail 11 is made of band- or strip-shaped steel plate which is bent in the longitudinal direction so that there is formed a V-shaped groove 23. A lower side 24 of groove 23 forms, as is shown in FIG. 2, a track directed inwardly towards the carriage 13 for a carriage wheel 25. An upper side 26 of the groove 23 projects inwardly over the lower so that a lower flange 27 of the rail and its upper flange 28 lie in approximately the same vertical plane. The upper rail flange 28 is additionally provided with a planar, outwardly directed leg 29 so as to make the edge of the rail less dangerous on contact. The lower side 24 of groove 23 forms on its outer side a clamping abutment against the end portion 18 of sleeper 12.

The wheels 25 consist of discs 30 which are fastened by, for example, welding to pipe-shaped hub 31 having a cap 32. In the hub 31 there is fastened, in addition, a sleeve 33 formed from a material which reduces friction.

Figure 3:
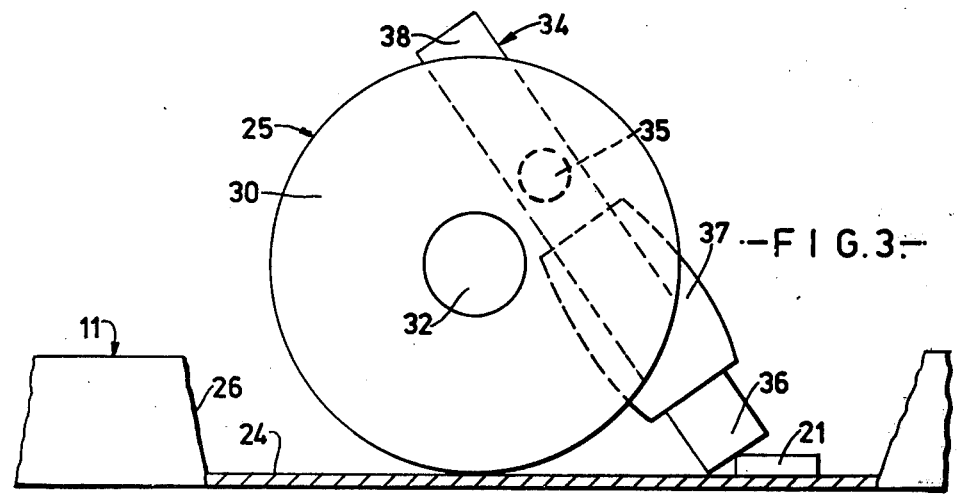
FIG. 3 is an end view, partly in section, of a wheel mounted on the carriage of the system of FIG. 1.

In FIGS. 2 and 3, there is shown a reverse run lock which comprises a bar 34 pivotally mounted on a shaft pin 35 which is detachably inserted in a bushing 51 which is fastened, for example, by welding on the side of the cross beam 15 and approximately parallel to the first shaft pin 17, shaft pin 35 terminating somewhat within the wheel 25. Such a bar (or stop arm) 34 is arranged on each side of the carriage 13, preferably on the same cross beam 15 as is shown in FIG. 1. The bar 34 is thus two-armed with portions 36,38 of dissimilar length, the long portion 36 being designed to hang downwards in the downgrade direction of the rail 11 and to slide along the trackforming lower side 24 of the groove 23 in order to thrust against the clamp plates 21 when the carriage 13 tries to move downwards. On the long portion 36 there is fastened a floating body 37 which together with the short portion 38 swing the long portion 36 upwards when the carriage is led below water.

The carriage 13 is furthermore provided with a centering arrangement for a boat keel which is indicated schematically by a reference numeral 39. In addition, the carriage 13 is provided with support hoops or the like for the sides of the boat.

Figure 4:
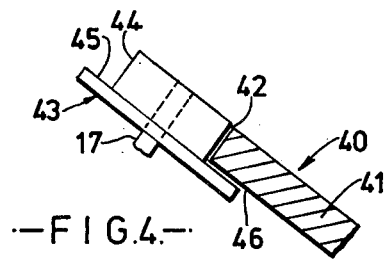
FIG. 4 is a scrap view, partly in section, of a rail and associated modified wheel of another embodiment.

In FIG. 4, there is illustrated, in another embodiment, an alternative design of wheel and rail profile. Rail 40 is here provided with a flange 41 obliquely positioned to project upwardly at an angle of about 45°, a narrow end side 42 of which forms a track for a wheel 43. The wheel 43 has a central, cylindrical web 44, the periphery of which forms an abutment against side 42 of the rail 40, and an annular flange 45 which projects within the web 44 and can form an abutment against the inside 46 of the rail flange 41 when the wheel 43 is raised. The wheel 43 can be mounted in the same way as in the previous embodiment. This means that the wheel and shaft pin 17 can be readily assembled and disassembled, for example, in connection with the transportation of the rail/carriage system.

Figure 5:
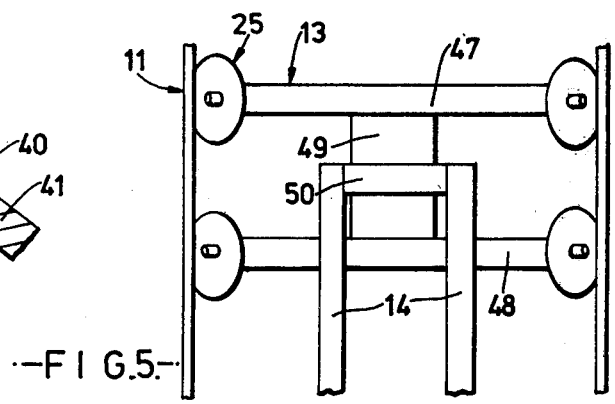
FIG. 5 is a cut-off plan of an alternative wheel suspension.

In FIG. 5, there is illustrated, in a third embodiment, an alternative form of cross beam suspension, in which there are employed two cross beams 47,48 which are secured in bogie form on an intermediate member 49 which supports the longitudinal beams 14. The intermediate member 49 is box-shaped with an inner hollow space and fastened to a cross bar 50. By appropriate dimensioning, the longitudinal beams 14 and one or the other of the cross beam 15, 47,48 can be used jointly for the construction of a carriage with 4,6 and 8 wheels without the need for other further components than one or two intermediate members 49 with a cross bar 50. The portable equipment for the boat ought in this case to be positioned between the cross beams 47 and 48 of each pair so that a uniform loading distribution is obtained.

The intermediate member 49 is fastened in a known manner to the cross bar 50 which permanently connects the longitudinal beams 14, so that it is restrictively pivotable about a transverse axis. The rail 11 (FIG. 2) can have a lower side or track 24 which forms an angle in a transverse direction of from 0°-60° to the horizontal plane while the upper side 26 can form an angle of from 45°-120° with the lower side 24.

All the beam hollow spaces can be filled, with advantage, with a floating material, such as "monoplast" (expanded polyurethane). It is advantageous to make the specific gravity of the carriage less than 1. In this way, sinking of the carriage is avoided in the event it is lost in water.

In order to keep the stop bars or arms 34 in a release position during launching of the boat, a locking mechanism (not shown) is arranged in an appropriate manner.

I claim:

1. System for launching or hauling up pleasure and like small boats which comprises a pair of rails joined together by sleepers and a carriage supported by at least two pairs of carriage wheels to run along the rails, the rails being designed so that each of them forms a first track which is obliquely disposed in a lateral direction relative to a horizontal plane and a second track adjacent said first track and forming an angle in a lateral direction relative to the first track, said first track forming an abutment for the supporting surface of the wheels and the latter having axes obliquely disposed relative to a horizontal plane.

2. The system of claim 1, wherein said first track forms an angle in a transverse direction which is from 0°-60° to the horizontal plane.

3. The system of claim 1, wherein said second track forms an angle of 45°-120° with said first track.

4. The system of claim 3, wherein the first and second tracks form an angle in a lateral direction of from 60°-90° with respect to each other.

5. The system of claim 1, wherein the second track is arranged so that it extends upwardly from the first track at the outer edge of the latter.

6. The system of claim 5, wherein said wheels are adapted to roll along the outer edge of said first track.

7. The system of claim 1, wherein each of the wheels is removeably mounted on a shaft pin which is detachably supported by bushing means permanently connected to said carriage with its axis obliquely disposed in a transverse direction.

8. The system of claim 1, wherein at least one of the rails is provided with stops at mutual intervals for a reverse run lock which is pivotably fastened to said carriage.

9. The system of claim 8, wherein the stops are formed by clamp plates for holding the rails securely to the sleepers.

10. The system of claim 1, wherein with double sets of wheels there is arranged a bogie suspension in which each of the bogie shafts is designed as a separate individual shaft.

* * * * *